Jan. 27, 1953     H. L. BARBER ET AL     2,626,759
JAW CRUSHER

Filed May 7, 1949     3 Sheets-Sheet 1

INVENTOR.
Hiram L. Barber
BY George L. Sellars
Wood, Arey, Herron & Evans
ATTORNEYS.

INVENTOR.
Hiram L. Barber
BY George L. Sellars
Wood, Arey, Herron & Evans
ATTORNEYS.

Patented Jan. 27, 1953

2,626,759

UNITED STATES PATENT OFFICE 2,626,759

JAW CRUSHER

Hiram L. Barber, Newton, and George L. Sellars, Milford, Ohio

Application May 7, 1949, Serial No. 92,016

2 Claims. (Cl. 241—140)

This invention relates to crushers or disintegrators in which material is reduced in particular size. The apparatus of the invention is adapted for the comminution of a wide variety of materials such as rock or stone, coal, ores and the like.

The invention is disclosed particularly in relation to a crusher capable of cracking or reducing spheroid particles of relatively small size, such as torpedo gravel, which has virtually been uncrushable in a practical way by means of the equipment heretofore available. Torpedo gravel or pea gravel, as it is sometimes called, comprises relatively smooth spheres or balls of rock approximately ¼ to ⅜ inch average diameter produced as screenings in the workings of a gravel pit or bank. To a limited extent these particles are used in asphalt aggregates, but because of the smooth rounded nature of the surfaces which they present in a finished roadway they become very slippery when wet and their use is unsatisfactory for that reason. Torpedo gravel is too smooth in particle size to be used in quantity in the preparation of concrete aggregates and too large to use as a substitute for sand. On account of the limited utility of this product substantial quantities of it accumulate at the gravel plants virtually as waste material. Conventional jaw crushers are not capable of crushing or cracking torpedo gravel in a satisfactory way because of the high percentage of fines which are produced and because of the low yield of useful product and the attendant screening expense. On the other hand, roll type crushers are capable of cracking the particles in a satisfactory way but the particles are so hard that the rolls of the crusher soon become grooved and worn and must be replaced; hence the use of such equipment is prohibitively costly.

The principal objective of this invention has been to provide a crusher which is capable of disintegrating torpedo gravel into particles of useful size and shape, either when torpedo gravel constitutes the primary infeed or when torpedo gravel is present as only a portion of an infeed material which also contains rock or gravel in the larger sizes. It is also to be observed that the objectives just expressed are directed to a particular problem which has existed in the gravel industry for many years but that the machines of this invention are not limited to this utility. On the contrary, they find ready usage in all of the fields where jaw or gyratory crushers are employed or where products other than torpedo gravel are to be crushed or disintegrated.

Briefly, the machines of this invention consist essentially of a gyratory rotor constituting the dynamic element of the equipment, one or more jaws arranged respectively at one or both sides of the rotor, and means for imparting impact motion to the rotor adjacent the points of infeed and for simultaneously imparting essentially a shearing motion to the rotor at or near the points of discharge. Otherwise expressed, a crushing action is provided which has been found to be capable of disintegrating torpedo gravel as well as other material by exposing it progressively to impact and to shear in the passage of the material through one or more crushing throats During impact those particles which are caught and subjected to direct blows are cracked and fractured as desired. However, while it is common experience that one might hit a single spheroid ball with a hammer through direct blow and thereby break that particle, still it is also common experience that the same hammer or the same blow is ineffective if the blow is directed at a multiplicity of spheroid particles. This is true because they skid or slide in relation to one another with the result that the force is not localized at one particle only. In the present machines, some particles, including particles of larger sizes, are caught and are disintegrated principally by impact force. However, in conjunction with this impact motion, a shearing motion is employed which squeezes the particles that have not previously been disintegrated and crushes them through the application of compressive shearing forces from which they cannot escape. When large particles are disintegrated by impact blows, the fractures are clean and there is little production of fines or particles which are so small as to be useless. On the other hand, the smaller sizes of material, subjected to a squeezing shearing action in accordance with the present invention, also fracture sharply without producing any significant quantity of fines or off-grade material. Hence, machines of the present invention operate effectively in the reduction of particle size with only a low yield of waste products.

To produce the desired motion for impact and for shear the rotor of the apparatus, in a typical embodiment, may be oscillated, as through an eccentric, to produce translating motion of its surface toward and from one or more jaws. Coincidentally, in a typical embodiment of the improvement, the lower portion of the rotor may be guided for movement in a linear path extending generally in a longitudinal direction with respect to the jaw or jaws, whereby a particle caught at this zone is subjected principally to shearing, squeezing forces. This embodiment, therefore may be provided through the use of a simple eccentric drive for the rotor and a simple linear guide for its shear portion, while the jaws are stationary. It will also be understood, however, that the shearing action if desired may be coupled with the impact action through timed movement of both the rotor and the jaw or jaws in the desired directions.

From the foregoing discussion of the principles upon which the invention is predicated, and the following detailed description of the drawings which illustrate a typical embodiment of the improvement, those skilled in the art readily will comprehend the various modifications to which the invention is susceptible within the meaning of the claims.

Figure 1:
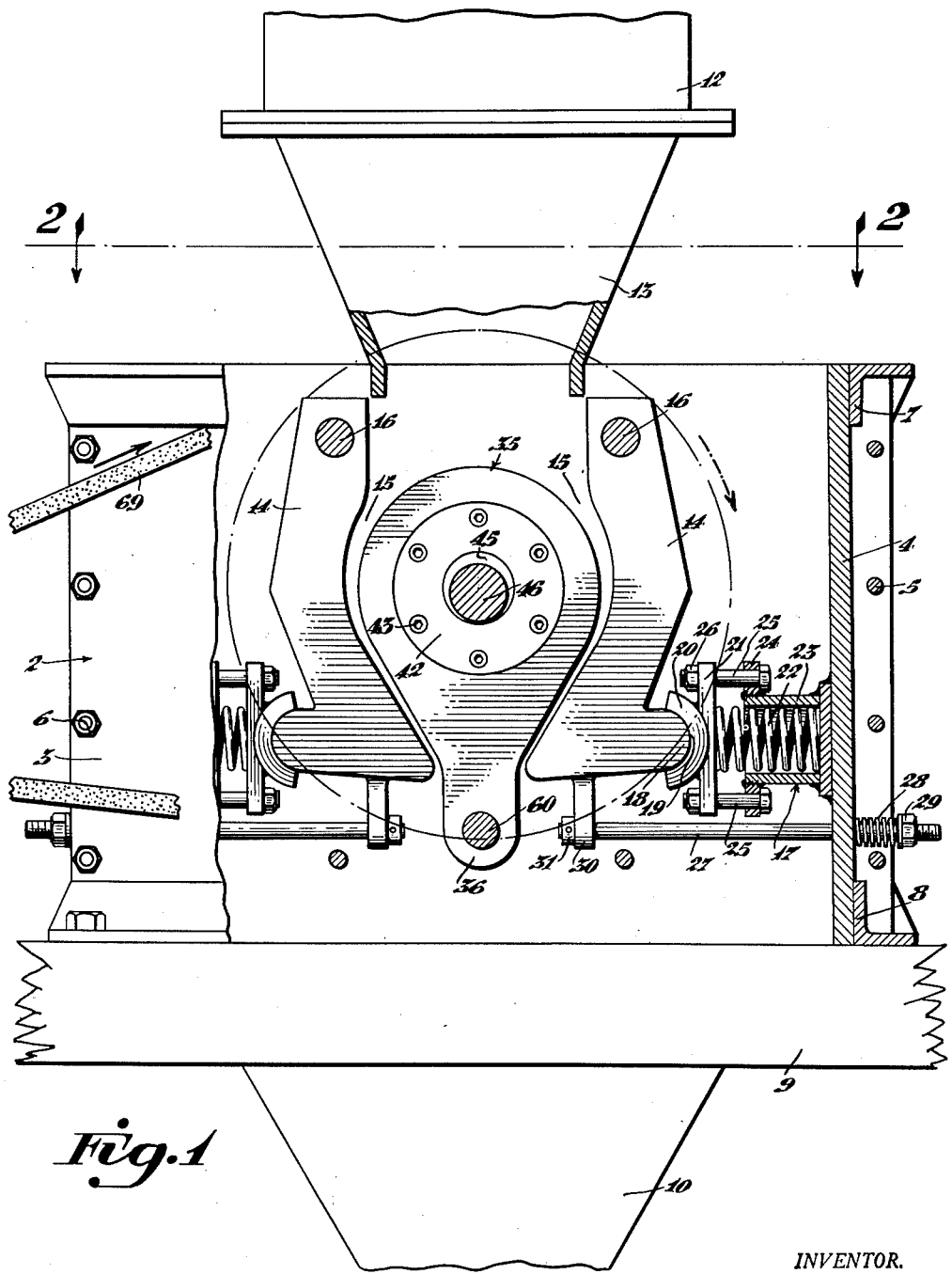
Figure 1 is a side elevation, portions of the exterior or housing of the apparatus being broken away to show details of the interior construction.
Figure 2:
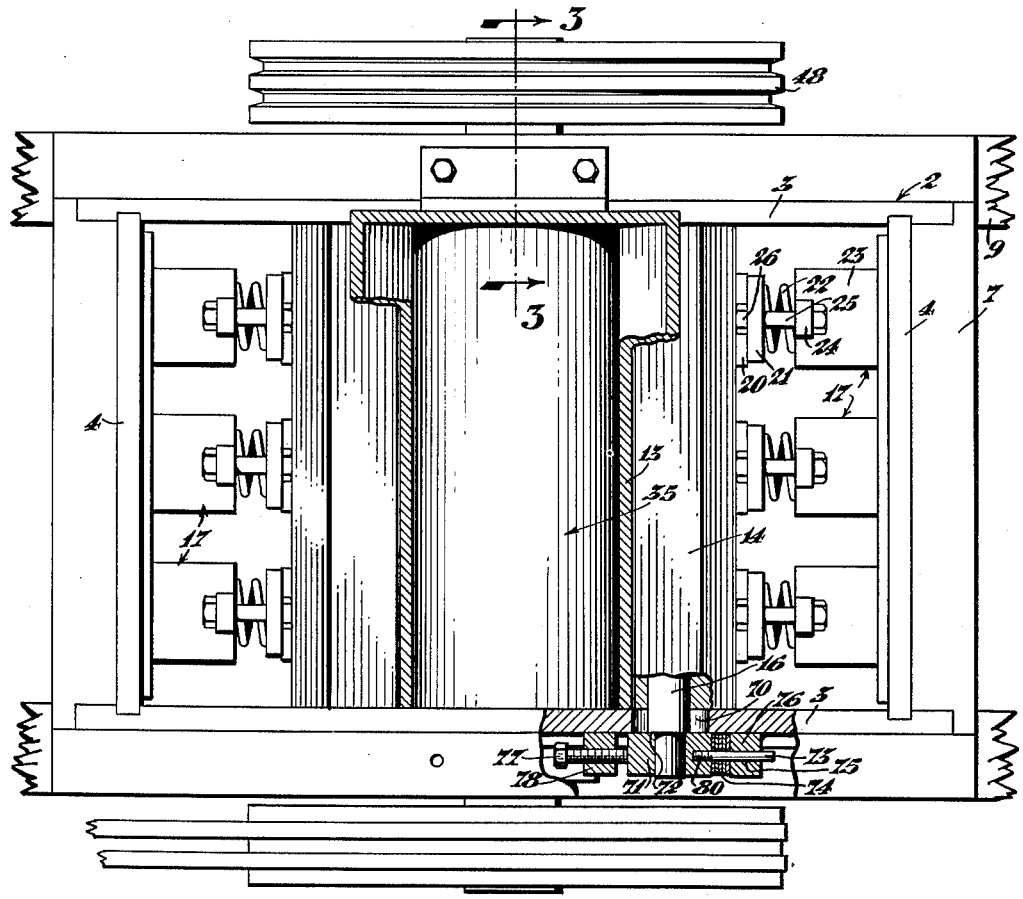
Figure 2 is a plan view taken on the line 2—2 of Figure 1.

The machine shown in the drawings consists essentially of a box or frame, indicated generally at 2, comprising side walls 3 which are fastened to end walls 4 as by means of cross bolts 5 having nuts 6. The end walls in this construction are spaced inwardly from the extremities of the side walls 3 while the bolts 5 pass adjacent the end walls through bores in the side walls, nuts 6 thus holding the sides and ends firmly together to delineate a rigid box. This box at its upper and lower portions is reinforced by angle members indicated generally at 7 and 8 respectively. The bottom and top of the box 2 are open and the bottom is adapted to reside upon a table or support 9 which carries a delivery chute 10 communicating with the bottom of the apparatus. Infeed of material to the machine is through a chute or hopper spout 12 having a tail pipe 13 extending downwardly into the housing for delivery of material to the crushing mechanism which is disposed therein.

In the construction shown in the drawings, two jaws 14 are employed for exerting crushing action upon material which is caused to pass through the opposed throats 15. The jaws 14 at their upper portions are hung upon cross rods 16 which in turn are supported by the side walls of the housing 2. The jaws are movable upon the support rods 16 and the lower portions of the jaws are sustained against outward movement preferably, though not necessarily, through a yieldable, adjustable support construction, one unit of which is indicated generally at 17. In the instance shown, three of these units 17 are provided for each jaw element. In this arrangement, each jaw has an outwardly extending boss or stub 18 preferably coextensive with the jaw length. The outer end of each boss or stub is rounded to present an arcuate surface 19 engaged by pads or seats 20 carried by the units 17. Each pad is fixed to the face of a plate 21 which is engaged at its outer face by a heavy compression spring 22 which has its opposite end buttressed against the end wall 4 of the housing. The compression spring is held against displacement by means of a sleeve 23 which is fixed at its outer end to the buttressed end wall 4. This sleeve at its outer end has a pair of diametrically disposed flanges 24 respectively bored to receive stop bolts 25—25 which pass through these bores and through complementary bores in the plate 21. Nuts 26 on the stop bolts 25 provide means for adjusting the pads inwardly or outwardly relative to the jaw elements. For purposes of illustration only simple nuts are shown on these bolts as well as on other parts of the machine, though it will be understood that here as elsewhere in the mechanism lock devices may be employed as is conventional in the art to prevent detachment of the parts under the vibrations that occur when the machine is operated.

Adjusting movement of the jaws in the outward direction from a minimum setting is provided by tightening the nuts 26 on the bolts 25, but in order to maintain the respective arcuate surfaces 19 in engagement with the seats 20, a spring urged tie rod 27 is provided for each jaw element. Each one of these tie rods pass through the respective end wall of the machine beyond which it carries a compression spring 28. The outer end of the tie rod is threaded to receive an adjustment nut 29, a washer being provided to seat the outer end of spring 28 at nut 29. Inside the housing 2 the tie rod passes through an ear 30 depending from the lower portion of the jaw 14 with a collar 31 pinned to the end of the tie bolt beyond the ear. With this construction tightening of nuts 29 tends to pull the jaws 14 into seating engagement against the yieldable supports 17.

Yieldability in the mounting of the jaws is not necessary but is desirable to prevent fracture of the jaws or the supporting parts in the event that a jaw is subjected during use to forces which are beyond its limits of strength. This practice is conventional and in place of the yieldable mountings disclosed herein, other mounting arrangements may be employed which are known by those skilled in the art.

The rotor of the apparatus to which the invention particularly is directed in indicated generally at 35. This unit consists of a member having its ends arranged adjacent the side walls 3 of the housing, the rotor being disposed between the respective jaws 14 to delineate the throats 15. The rotor in cross section may be generally of inverted tear drop or pear shape, the upper part being of largest diameter and generally rounded while the lower portion is of progressively decreasing width terminating in a tail portion 36. In cooperation with this shape, the jaws are contoured in cross section generally to complement the shape of the rotor but with the jaws being spaced farthest from the rotor at its upper portion and nearest to the rotor at its tail 36, such that the throats 15 are of progressively constricted area, assuming the rotor to be centralized between the jaws.

Figures 3, 4:
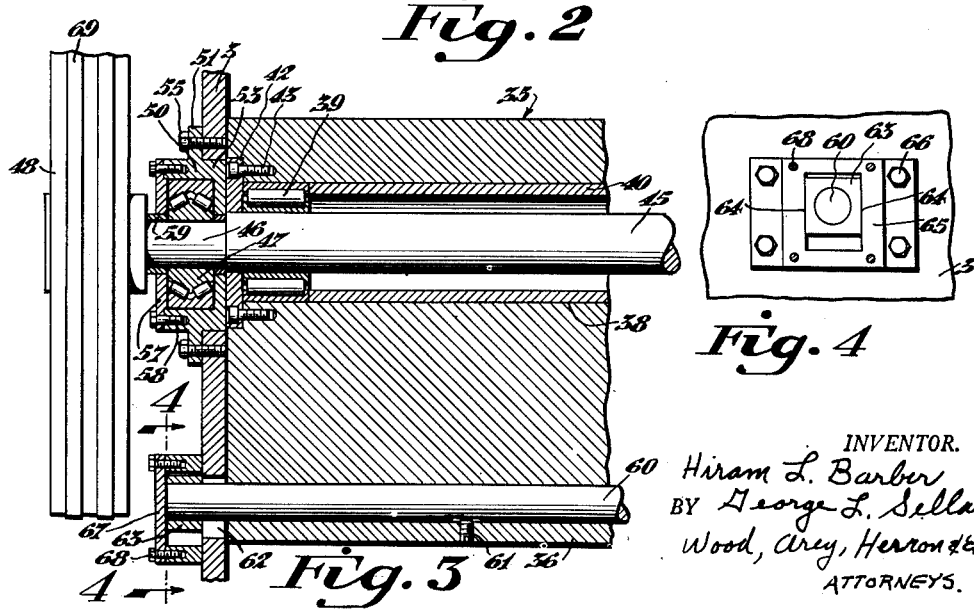
Figure 3 is a fragmentary sectional view taken on the line 3—3 of Figure 2 illustrating details of the rotor drive and the guide means for the lower portion thereof.
Figure 4 is a fragmentary elevation of the rotor guide, as taken on the line 4—4 of Figure 3.

For driving purposes, the upper portion or head of the rotor is bored as at 38 with an anti-friction bearing 39 mounted in the bore 38 at each end of the rotor. These bearings are spaced from one another by a spacer sleeve 40 which resides within the bore 38. The bearings 39 are held in their seats by means of bearing end plates 42 which in turn are fastened by screws 43. The retaining plates 42 reside in appropriate recesses and their outer surfaces are flush with the ends of the rotor. Anti-friction bearings 39 receive a drive shaft 45, which at each end has an eccentric portion 46 received within an anti-friction bearing 47. The throws of the eccentric portions 46 at the opposite ends of the drive shaft are in alignment with one another and the bearing constructions, as illustrated in Figure 3, are of course duplicated at the opposite side walls of the machine. However, the drive shaft is extended at one side of the machine to carry a drive pully 48. In more particular detail, the antifriction support bearing 47 for the drive shaft has its outer race seated in a cage 50 which comprises an annular flange 51 bearing upon the end wall 3 of the machine. Inwardly of this flange the cage has an annular portion 53 which is received in a bore of the end wall 3 of the housing and the whole cage is fastened rigidly to the end wall by means of bolts 55 passing through the annular flange 51 into the end wall 3. At the outer face of the cage, it carries a cover plate 57, which is held in fixed position by means of screws 58. A sleeve 59 surrounding the endwise portion of the drive shaft 45 extends through the cover plate 57 and terminates adjacent the inner race of the anti-friction bearing 47 for dust exclusion.

For purposes of description, the portions 46 at the ends of the drive shaft 45 have been termed "eccentric" portions, although these portions in fact delineate the axis of rotation of shaft 45 while the intermediate portion of shaft 45 engaged by anti-friction bearings 39, in fact, constitutes the eccentric portion which is effective to cause oscillation of the upper portion of the rotor toward and from the jaws upon rotation of the shaft.

The lower or tail portion 36 of the rotor is transversed longitudinally by shaft 60 which is held rigidly in position as through one or more set screws 61. This shaft projects outwardly beyond the ends of the rotor, passing through clearance apertures 62 of the housing side walls 3. Beyond the side walls, the shaft movably engages slide blocks 63 which have opposed surfaces 64 guided, slidably, by opposed guide surfaces of a box 65. This box is held in place upon the side walls 3 of the machine through bolts 66 and the box carries a cover plate 67 which is fastened by screws 68.

Figure 5:
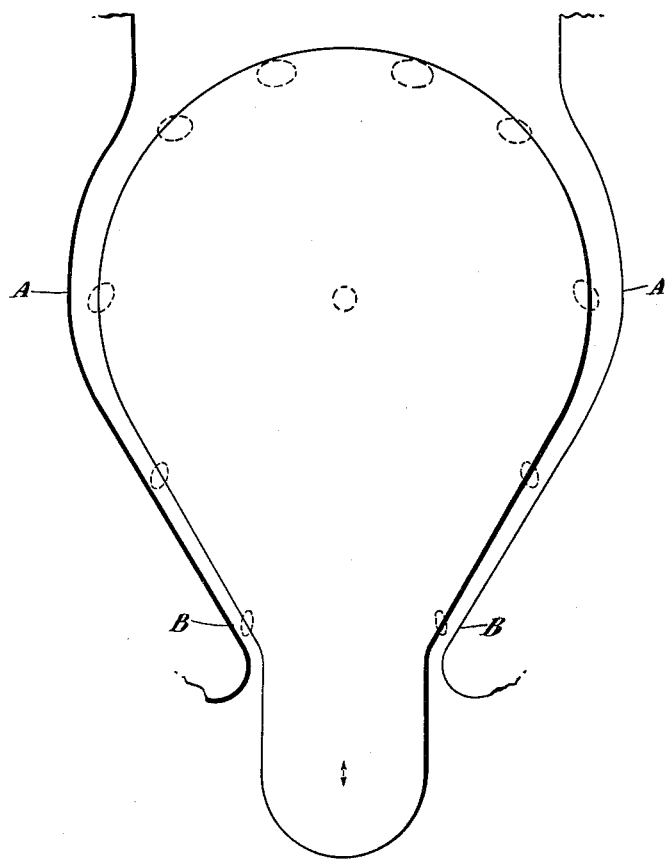
Figure 5 is a diagrammatic view illustrating the paths of movement of respective portions of the rotor in relation to the jaws of the apparatus, whereby the desired impact and shear forces are produced.

Rotation of the drive shaft 45 by means of power applied from a belt 69 engaging pully 48 causes the eccentric portion of the drive shaft to oscillate the head portion of the rotor toward and from the respective adjacent jaw surfaces. Hence, particles caught at the areas indicated at A (Figure 5) of the throat are subjected to direct compressive impact forces. The particles caught at this area in this manner will be of relatively large size and their disintegration will not be attended by the production of fines in substantial quantity as previously explained. However, the motion of the rotor is not purely an eccentric or gyratory motion since the bottom or tail portion of the rotor is guided so that it is free to move only in a vertical direction, as shown in the drawings, or only in a direction which is generally longitudinal of the adjacent jaw surface. Thus, the lowermost portion of the rotor element does not gyrate significantly but moves essentially in a linear direction. This transition in the types of movement is illustrated by the dotted lines shown in Figure 5 at the respective portions of the rotor element, the dotted lines representing the traces of points on the surface of the rotor. At the top, the motion is principally directly transverse or normal relative to the mating jaw surface, while at the bottom, movement is greatest in the vertical axis. Hence, at the bottom the effect, in respect to the adjacent jaws, is that of shear. Larger particles are caught and crushed by impact. Smaller particles pass by the area A, but as they are caught in the constriction of the throat as at areas B, they are both squeezed and sheared to size sufficiently smaller to enable them to pass the discharge apertures. Moreover, since the movement at these areas is relatively small, the net force exerted upon the particles at areas B is proportionately greater. Compression springs 22 in the yieldable mounting of the jaws are, of course, sufficiently heavy to sustain the jaws against movement during normal crushing but are sufficiently yieldable to permit the jaws to move and thereby prevent breakage of the parts should tramp iron or uncrushable materials enter the machine.

The adjustment afforded by the yieldable supports 17 pivots the jaws 14 around the support rods 16, and, therefore, by changing the setting of the adjustable supports 17, the lower portion of the throats 15 may be opened or closed. However, adjustment is provided also for the upper portions of the jaw elements 14. Thus, by adjusting the upper ends and the lower ends of the jaw elements relative to the rotor the passages delineated by the jaw elements and the rotor may be changed at will depending on the requirements of the material being operated on or to compensate for wear of the crushing elements.

The respective ends of each support rod 16 are carried in slots 70 formed in the side walls 3 of the housing and are journalled at each end in a block 71 which is fitted onto the turned-down end of the rod, the block resting against a shoulder 72 provided thereby. Each block 71 carries a pin 73 extending outwardly from the face of the block which is to the outside of the jaw. Each pin carries a plurality of spacer elements or shims 74 and the end of the pin is slidably engaged in a bore 75 through a boss 76 which is fixed to the side wall 3 of the housing. The opposite face of the block 71 is engaged by the end of a bolt 77 which is threaded through another boss 78 also fixed to the side wall 3; by tightening the bolt 77, block 71 is thereby forced against the shims. The inner end of the pin 73 is threaded as at 80 into the block 71 so that it may be removed and the number of shims between block 71 and boss 76 increased or decreased, in this way providing adjustment for spacing the jaws relative to the rotor. This type mounting for the support rods 16 is preferred because the crushing force of the jaws is distributed to the side walls 3 and not carried by the threads of adjustment bolts or the like as has been done in the past.

Machines adapted particularly to operate upon torpedo gravel need not have a wide entrance aperture to the throat since torpedo gravel is of relatively uniform small size. However, the machines constructed in accordance with this invention but adapted particularly for the disintegration of other substances, conveniently may be fabricated. These machines may be similar to the machine shown in the drawing but differ as to the distance between the rotor drive shaft 45 and the rotor guide shaft 60, the distance of projection of the head beyond the drive shaft 45 may be increased or decreased to thereby increase or decrease transverse movement, or the throw of the eccentric may be changed to vary both transverse movement and the shear movement. The shapes of the jaw elements and the rotor may be changed to provide substantially straight passageways at the sides of the rotor, however, the curved passageways are preferred and shown because they insure that small flat particles of gravel do not slide past the rotor with the flat profile normal to the rotor and thus escape being crushed. Through these variations in design, the shape of the paths of movement at the respective portions of the rotor conveniently may be adjusted to the requirements incidental to the crushing of a wide variety of substances.

Having described our invention, we claim:

1. A crusher for disintegrating solid tangible materials such as torpedo gravel which comprises a pair of static jaw elements and a dynamic crusher element disposed between said jaw elements, said crusher element being generally inverted pear shaped in lateral cross section having a bulbous head portion and a comparatively narrow tail portion, said head portion presenting convexly curved surfaces at the opposite sides thereof to the respective jaw elements, the respective sides of the crusher element below the head portion thereof, tapering progressively inwardly downwardly to said tail portion, an eccentric rotatable drive member adapted to impart gyratory motion to the head portion of the crusher element about the longitudinal central axis thereof, means for directing the tail portion of the crusher element in straight line movement along a path generally coinciding with the axis between the head and tail portions of the crusher element, the respective jaw elements at the opposite sides of the crusher element configurated to present surfaces to the crusher element generally complementing the contours of the respective sides of the crusher element, including concavely curved surfaces at the opposite sides of the bulbous head portion of the crusher element which converge toward and extend around the upper side portions of said bulbous head portion, and delineating therewith downwardly converging throats within which material is subjected to impact blows adjacent the bulbous head portion of the crusher before being subjected to shearing blows adjacent the tail portion thereof upon gyration of the dynamic crusher element.

2. A crusher for disintegrating solid tangible materials such as torpedo gravel which comprises a pair of static jaw elements and a dynamic crusher element disposed between said jaw elements, said crusher element being generally inverted pear shaped in lateral cross section having a bulbous head portion and a comparatively narrow tail portion, said head portion presenting convexly curved surfaces at the opposite sides thereof to the respective jaw elements, the respective sides of the crusher element below the head portion thereof tapering progressively inwardly downwardly to said tail portion, means for imparting a gyratory motion to the head portion of the crusher about the longitudinal central axis thereof, means for directing the tail portion of the crusher element along a path generally coinciding with the axis between the head and tail portions of the crusher element, the respective jaw elements at the opposite sides of the crusher element configurated to present surfaces to the crusher element generally complementing the contours of the respective sides of the crusher element, including concavely curved surfaces at the opposite sides of the bulbous head portion of the crusher element which converge toward and extend around the upper side portions of said bulbous head portion, and delineating therewith downwardly converging throats, means pivotally journalling the jaw elements at their respective upper ends, and means resiliently journalling the respective lower ends of the jaw elements, the respective means journalling the upper and lower ends of the respective jaw elements being substantially equally spaced above and below the longitudinal central axis of the crusher element.

HIRAM L. BARBER.
GEORGE L. SELLARS.

REFERENCES CITED

The following references are of record in the file of this patent:

UNITED STATES PATENTS

| Number | Name | Date |
|---|---|---|
| 17,294 | Poore | May 12, 1857 |
| 893,713 | Eggers | July 21, 1908 |
| 943,455 | Philips | Dec. 14, 1909 |
| 1,819,583 | Winters | Aug. 18, 1931 |
| 2,235,097 | Benson | Mar. 18, 1941 |
| 2,485,717 | Ebersol | Oct. 25, 1949 |

FOREIGN PATENTS

| Number | Country | Date |
|---|---|---|
| 18,945 | Great Britain | Aug. 16, 1897 |
| 315,994 | Italy | Mar. 14, 1934 |
| 580,475 | Germany | July 12, 1933 |